United States Patent [19]

Turnbull

[11] 4,447,868
[45] May 8, 1984

[54] REGENERATIVE RECTIFIER CIRCUIT

[75] Inventor: Fred G. Turnbull, Scotia, N.Y.

[73] Assignee: General Electric Company, Schenectady, N.Y.

[21] Appl. No.: 365,706

[22] Filed: Apr. 5, 1982

[51] Int. Cl.³ .......................................... H02P 13/26
[52] U.S. Cl. ....................................... 363/81; 363/87; 363/126; 363/127; 363/129
[58] Field of Search ................................... 363/79–81, 363/83, 85, 87, 88, 89, 126–129, 163, 37; 318/345 B, 762, 803

[56] References Cited

U.S. PATENT DOCUMENTS

| | | | |
|---|---|---|---|
| 3,484,676 | 12/1969 | Wilkerson | 363/128 |
| 3,909,698 | 9/1975 | Nill | 363/79 |
| 4,193,111 | 3/1980 | Wester | 363/126 |
| 4,319,177 | 3/1982 | Kawada et al. | 318/803 |
| 4,328,454 | 5/1982 | Okuyama et al. | 363/79 |
| 4,353,023 | 10/1982 | Kawada et al. | 318/762 |

FOREIGN PATENT DOCUMENTS

26039A1 11/1980 European Pat. Off. .
26038A1 11/1980 European Pat. Off. .

OTHER PUBLICATIONS

J. W. A. Wilson, "The Forced Commutated Rectifier as a Regenerative Rectifier"-IEEE Industrial Application Soc. Transactions, vol. 1A-14, No. 4, Jul./Aug. 1978, pp. 335-340.
P. C. Sen, "Thyristor DC Drives", pp. 129, 149, 150 and 151. Textbook Published by John Wiley & Sons, 1981.

*Primary Examiner*—William H. Beha, Jr.
*Attorney, Agent, or Firm*—William H. Steinberg; James C. Davis, Jr.; Marvin Snyder

[57] ABSTRACT

A three-phase regenerative rectifier provides power flow from ac to dc using a three-phase rectifier bridge. The reversal of the input ac voltage at the input frequency commutates current in the rectifier devices. A power transistor or field-effect transistor is coupled in inverse parallel with each rectifier device to provide a path for current from the dc output of the rectifier back to the ac supply during regeneration. The rectifier devices can be phase controlled thyristors or diodes. Control means sense the three-phase voltage and switch the transistors in phase with the ac supply. Commutation of the transistors is provided by their self-contained turn-off capabilities.

3 Claims, 11 Drawing Figures

REGENERATIVE RECTIFIER CIRCUIT

BACKGROUND OF THE INVENTION

This invention relates to regenerative rectifier apparatus capable of ac to dc rectification and power regeneration from a dc source to an ac supply.

A regeneration feature is often a requirement in a machine tool drive system in order to achieve rapid response to speed control changes. If a frequency command to the motor of the machine tool is reduced and the motor is not under load, it is not necessary to wait for friction and windage losses to slow the motor down when regeneration is available to convert the inertia of the motor to electrical energy. In some prior art drive systems the regenerated energy is dissipated through a resistor.

An object of the present invention is to provide regenerative capability to an ac supply from an ac to dc to ac adjustable voltage, adjustable frequency ac motor drive system.

Another object of the present invention is to provide regenerative capability to an ac supply from an ac to dc to dc adjustable voltage dc motor drive system or an ac to dc adjustable voltage dc motor drive system.

A further object of the present invention is to provide in an ac to dc rectifier the capability of regeneration of power from a dc source to the ac supply by reversing the direction of current flow from the dc output of the rectifier, rather than by reversing the dc output polarity.

SUMMARY OF THE INVENTION

In one aspect of the present invention a three phase regenerative rectifier provides power flow from ac to dc using a three phase rectifier bridge. The reversal of the input ac voltage at the input frequency commutates (i.e., turns off) current in the rectifier devices. A controllable switch with self-commutating ability, such as a power transistor or field-effect transistor, is coupled in inverse parallel with each rectifier device to provide a path for current from the dc output of the rectifier back to the ac supply during regeneration. Control means sense the three phase voltages and switch the transistors in phase with the ac supply. Commutation of the transistors is provided by their self contained turn-off capabilities.

BRIEF DESCRIPTION OF THE DRAWING

Features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

FIGS. 2A, B, C, D, E and F are waveform diagrams helpful in explaining the operation of FIG. 1;

FIGS. 6A-G is a waveform diagram helpful in explaining the operation of FIGS. 4A and B;

FIGS. 7A, B, C, D and E are waveform diagrams helpful in explaining the operation of the phase shift control circuit of FIGS. 4B and 8B;

DETAILED DESCRIPTION OF THE INVENTION

Figure 1:
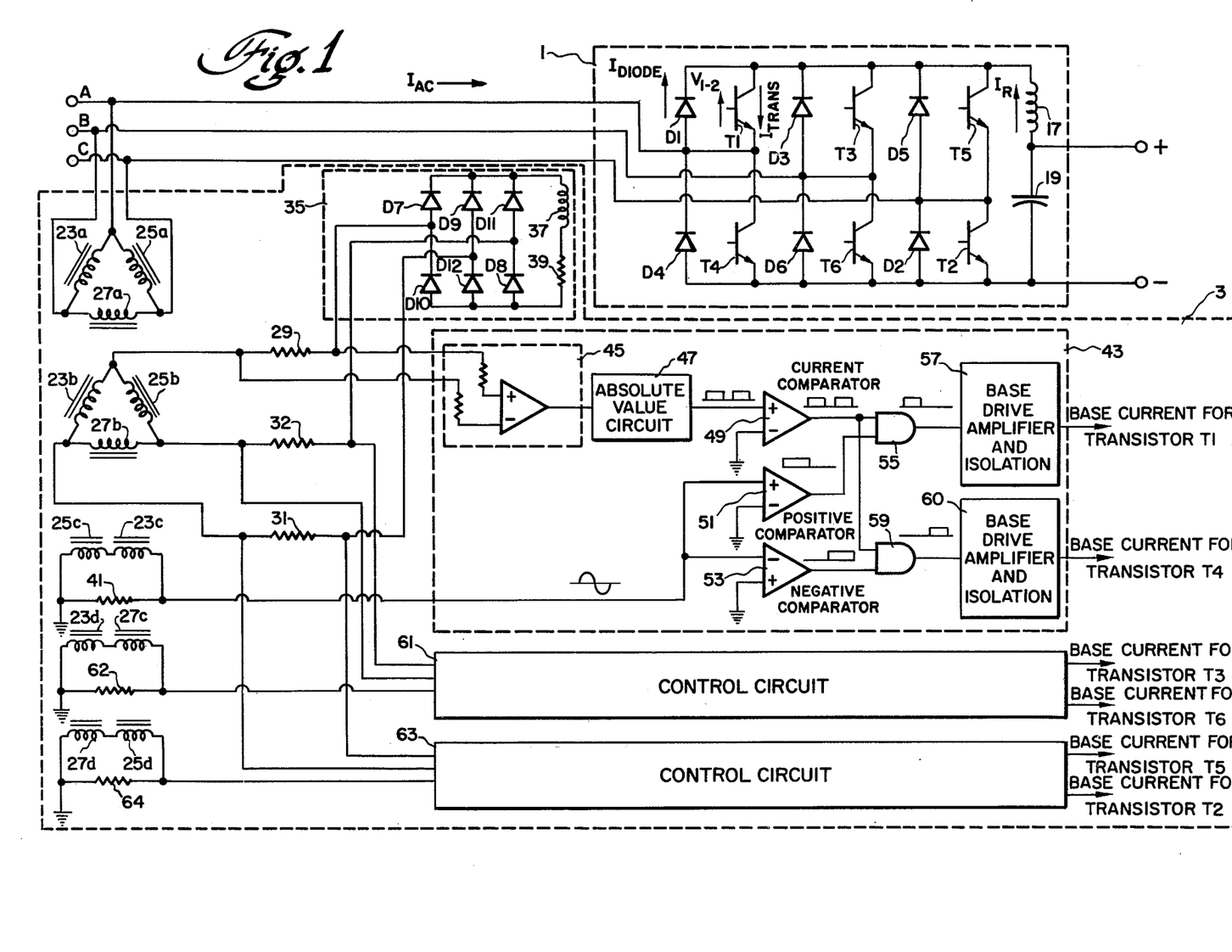
FIG. 1 is a part schematic, part block diagram representation of the three phase regenerative rectifier of the invention.

Referring now to the drawing wherein like numerals indicate like elements, there is illustrated in FIG. 1 a regenerative rectifier having an ac to dc converter 1 and a control 3. The converter 1 comprises a three phase diode bridge having six diodes D1, D2, D3, D4, D5 and D6. Each leg of the bridge is supplied by a phase of the three phase ac supply (not shown). Phase A is connected between diodes D1 and D4, phase B between diodes D3 and D6 and phase C between diodes D5 and D2. Each diode in the converter 1 has a bipolar NPN transistor T1-T6, respectively, connected across it with the collector of each transistor connected to the cathode of each diode and the emitter of each transistor connected to the anode of each diode. The transistors T1-T6 form an inverter. Connected between the collector of transistor T5 and the emitter of transistor T2 is a filter comprising the series combination of an inductor 17 and capacitor 19. The dc output of the regenerative rectifier is available across the capacitor 19. A voltage source inverter of either current or voltage controlled types could be connected to the output of the rectifier.

Control 3 comprises three transformers each having a primary winding 23a, 25a and 27a, respectively, and each transformer having three secondary windings 23b, 23c, and 23d, 25b, 25c and 25d, and 27b, 27c, and 27d, respectively. The primary windings of the three transformers are connected in a delta configuration with the phase A voltage connected to the junction of windings 23a and 25a, phase B voltage connected to the junction of windings 23a and 27a and phase C voltage connected to the junction of windings 25a and 27a. The secondary windings 23b, 25b, and 27b are connected in a delta configuration. One end of a current measuring resistor 29 is connected to the junction of winding 23b and 25b, one end of the current measuring resistor 31 is connected to the junction of winding 23b and 27b and one end of a current measuring resistor 32 is connected to the junction of winding 25b and 27b. The other end of each of the resistors 29, 31 and 32 provides a single phase input to a three phase full wave diode bridge 35 having diodes D7-D12. Connected in series across the rectified output of the diode bridge 35 is an inductor 37 and a resistor 39.

Secondary windings 23c and 25c are connected in series. Connnected across the series combination is a load resistor 41. One end of resistor 41 is connected to a control circuit ground and the other end provides phase A line-to-neutral voltage to a control circuit 43.

The other input to control circuit 43 is taken across resistor 29. A differential amplifier 45 in control circuit 43 is connected across resistor 29. The output of the amplifier 45 is in phase with the line current in phase A. The output of the amplifier 45 is connected to an absolute value circuit 47 which is connected to the noninverting input of a current comparator 49. The inverting input is coupled to control circuit ground. Phase A line to neutral voltage from resistor 41 is connected to the noninverting input of a positive comparator 51, and the inverting input of a negative comparator 53 in control circuit 43. The inverting input of positive comparator 51 and the noninverting input of the negative comparator 53 are connected to control circuit ground. The output of current comparator 49 is connected to one input of a two input AND gate 55. The output of positive comparator 51 is connected to the other input of AND gate 55. The output of AND gate 55 is connected to a base current amplifier and isolator 57 which provides base current to transistor T1. A two input AND gate 59 has the output of current comparator 49 connected to one input and the output of negative comparator 53 connected to the other. The output of the AND gate 59 is connected to a base current amplifier and isolator 60 which in turn provides base current to transistor T4. A control circuit 61 for phase B provides base current to transistors T3 and T6, and has the same configuration and elements as control circuit 43. One input to control circuit 61 is the line-to-neutral voltage from one end of resistor 62 which is connected across a series combination of windings 27c and 23d. The other input to control circuit 61 is the voltage across resistor 32. Similarly, the control circuit 63 provides base current signals to transistors T5 and T2 and has an input of phase C line-to-neutral voltage obtained from one end of the resistor 64, which is connected in parallel with the series combination of secondary windings 25d and 27d, and the voltage drop across resistor 31.

Figure 2:
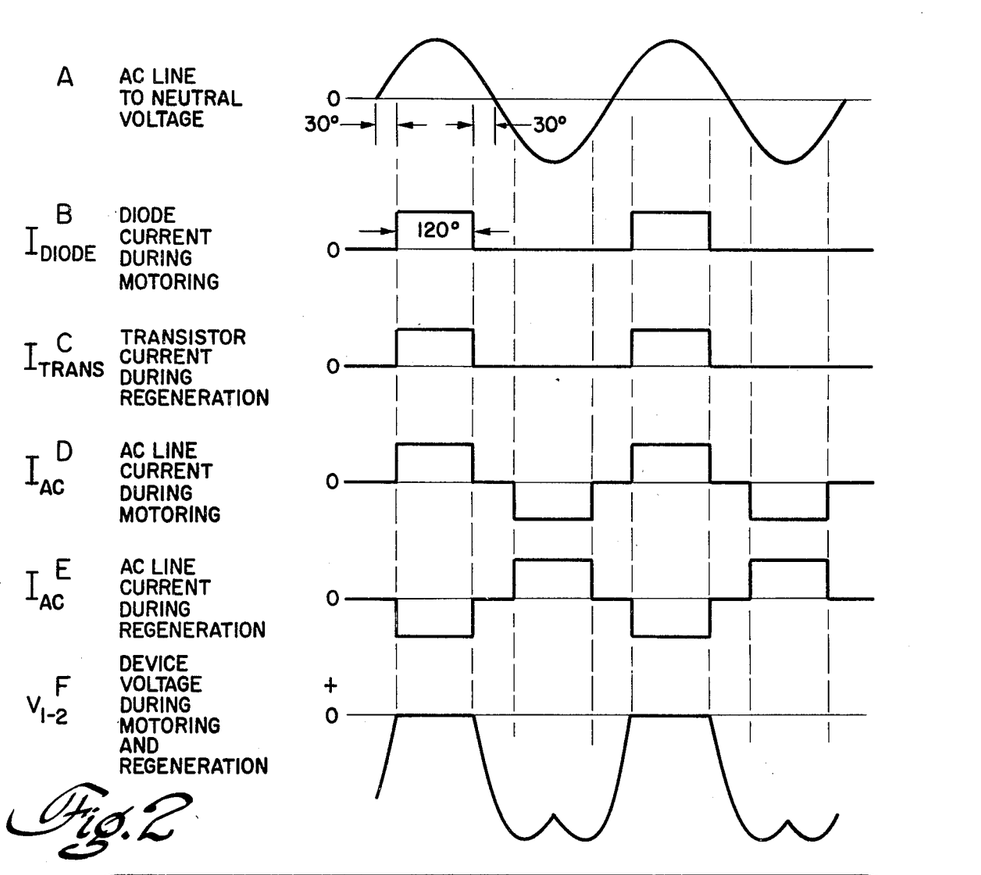

The operation of FIG. 1 will now be explained for the situation in which the voltage output appearing across capacitor 19 serves as the dc link voltage for a voltage source inverter, which might be of the pulse width modulated current or voltage controlled type, which provides power of variable voltage and frequency to a load capable of regeneration, such as a motor. FIGS. 2A-F are helpful in explaining the operation of FIG. 1. FIG. 2A shows a waveform representation of one phase of the ac line to neutral voltage. FIG. 2B shows a waveform representation of the diode current in the rectifier during motoring (power flow from ac to dc). FIG. 2C shows a waveform representation of the transistor current during regeneration. FIG. 2D shows a waveform representation of the ac line current during motoring. FIG. 2E shows a waveform representation of the ac line current during regeneration. FIG. 2F shows a waveform representation of the voltage across diode D1 and transistor T1 ($V_{1-2}$ in FIG. 1) during motoring and regeneration.

The diode bridge shown in FIG. 1 does not allow control and adjustment of the dc link voltage which appears across capacitor 19. The input line current for continuous conduction, which occurs during motoring, flows in the ac input line as 120° intervals of alternating current separated by 60° intervals of no current. Each 120° interval of current is centered about the positive peak of the line-to-neutral voltage waveform of that phase shown in FIG. 2A. Reversal of the input voltage at the input frequency commutates diode current. The diode current during motoring is shown in FIG. 2B. During regeneration, which occurs when the voltage from the motor (not shown) is reflected through the inverter (also not shown) and appears across capacitor 19, the voltage across capacitor 19 is greater than the voltage supplied by the ac source. The reflected voltage across capacitor 19 causes the direction of dc current to reverse. A path for regenerative current is provided by the six power transistors T1–T6. The conduction angle of each transistor is 120° of the input ac cycle and the conduction interval is synchronized and centered about the positive peak of the line to neutral voltage of the appropriate ac phase, as shown in FIG. 2C. The base drive signal for the six transistors is provided by control circuit 3. Commutation of the current from each transistor during regeneration is provided by the self-turn-off capabilities of the transistors.

Three-phase low power rectifier 35 is supplied with current from transformers 23, 25 and 27. The transformers provide isolation between the power and the control circuits 43, 61 and 63. The signal level rectifier 35 provides a signal representative of the current that flows in the main rectifier during motoring. This representative signal however, does not disappear when the main power circuit is transitioning through a period of zero current between rectifying and inverting; that is, the dc load, comprised of the inductor 37 and resistor 39, establishes a current flow that is in phase with, and approximates the characteristics of current in the main rectifier inductor 17.

Current measuring resistors 29, 31 and 32 are provided in the ac input leads to the low power rectifier. These resistors have a resistive value much lower than the load resistor 39 so as not to distort the current signal. Differential amplifier 45 in control circuit 3 senses the voltage drop across resistor 29 which is in phase with the line current in phase A of the regenerative rectifier. The differential amplifier 45 output is a 120° conduction ac waveform referenced to signal ground. The ac current signal is rectified in the absolute value circuit 47 and compared with zero volts in current comparator 49. The output signal is positive for 240° of the total period.

The line-to-neutral voltage of phase A is obtained by phase displacement of the line-to-line voltages in secondary windings 23c and 25c. The secondary windings 23c and 25c are connected in series with the resultant voltage across the series combination being in phase and proportional to the line-to-neutral voltage. The line-to-neutral voltage thus obtained is compared with zero volts in positive comparator 51 and negative comparator 53. Positive and negative comparators 51 and 53, respectively, separate the line-to-neutral voltage into two signals, one that is positive for 180° during the positive half cycle of the line-to-neutral voltage and the other signal which is positive for the negative half cycle of the line-to-neutral voltage.

The output signals of positive comparator 51 and the output signals of current comparator 49 are combined in an AND gate 55. The output signal from the AND gate, which is of 120° duration and centered about the positive peak of the line-to-neutral voltage, is amplified and ohmically isolated by base current amplifier 57 and becomes the base current signal to transistor T1. The negative half cycle of the line-to-neutral voltage from negative comparator 53 is combined in AND gate 59 with the output of current comparator 49 to provide signals of 120° duration centered about the negative peak of the line-to-neutral voltage to the base current amplifier 60, serving as a base current signal to transistor T4. Control circuit 61 operates in a similar manner to provide base current signals to transistors T3 and T6. Similarly, control circuit 63 provides base current signals to transistors T5 and T2. Alternate conduction paths from phase A to phase B or C do not occur in transistors T3, T5, T6 or T2, since these transistors do not receive a base current signal when diode D1, transistor T1, diode D4 or transistor T4 is carrying current, due to the way in which the base current signals are developed from voltage waveforms and current waveforms in the signal rectifier. The order in which the transistors in converter 1 are biased into conduction is transistor T1, T2, T3, T4, T5, T6, T1 . . . , with pairs of the consecutive transistors (T1 and T2, T2 and T3, etc.) conducting at the same time.

During very light load conditions and a finite dc link inductance, current can flow, for example, in either diode D1 or transistor T1 during a given 120° interval of time. The application of base current signals during motoring and regeneration allows the system to transition smoothly from motoring to regeneration.

Figure 3:
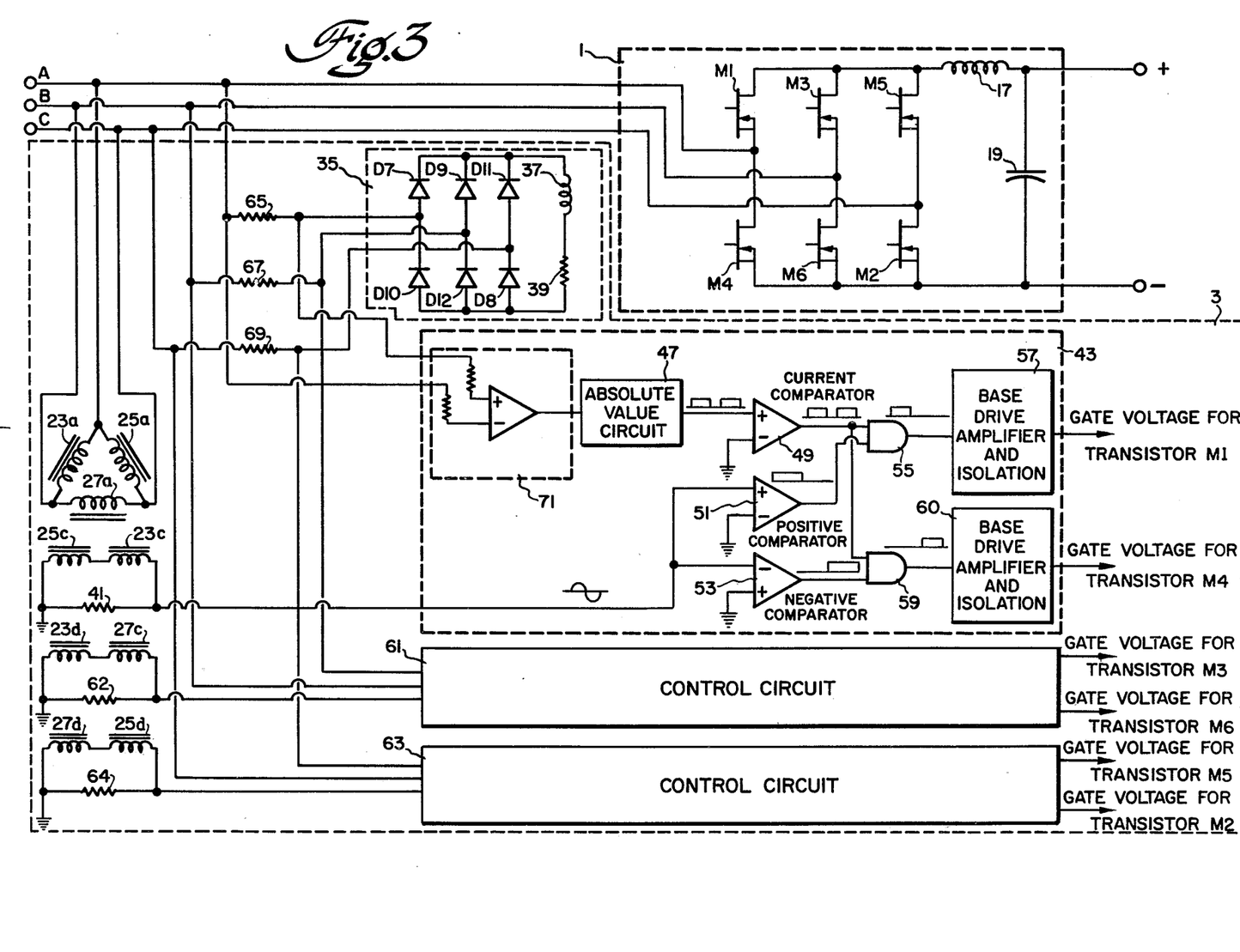
FIG. 3 is a part schematic, part block diagram representation of a three phase regenerative rectifier using field-effect transistors in accordance with the present invention.

FIG. 3 shows the regenerative rectifier of FIG. 1 with a power MOSFET substituted for each parallel combination of the transistor and reverse diode. N channel enhancement mode MOSFETs are shown which have inherently built into them integral reverse junction rectifiers. Diode D1 and transistor T1 are replaced by MOSFET M1, diode D2 and transistor T2 are replaced by MOSFET M2, and similarly with diodes D3-D6 and T3-T6 which are replaced by MOSFETs M3-M6, respectively. Power MOSFETs having integral reverse PN junction rectifiers are available, for example, from International Rectifier, El Segundo, Calif.

An alternative technique for line current measurement in control 3 of FIG. 1 is shown in FIG. 3. A low power three phase full wave rectifier having diodes D7-D12 is energized directly by the high voltage three phase power supply, through current measuring resistors 65, 67 and 69. A resistor 39 and inductance 37 are connected in series across the output of the diode bridge as in FIG. 1 to provide current signals in phase and approximating the motoring (power flow from ac to dc) characteristics of the main rectifier. Even though the current flowing in signal rectifier 35 is small, the voltage applied to signal rectifier 35 is the rated three phase supply voltage. Differential amplifier 45 in control circuits 43, 61 and 63 of FIG. 1 is replaced in FIG. 3 by an instrumentation amplifier 71 having a very high common mode voltage rejection ratio, (where common mode rejection ratio is defined as a measure, stated as a voltage ratio, of how well a differential amplifier ignores a signal which appears simultaneously and in phase at both input terminals) since the voltage drop across resistors 65, 67, and 69 is the desired input signal for control circuits 43, 61 and 63, respectively. The resistors at the input to instrumentation amplifier 71 provide a very high impedance between the input power supply and the logic level control circuits 43, 61 and 63, but do not provide ohmic isolation.

Figure 9:
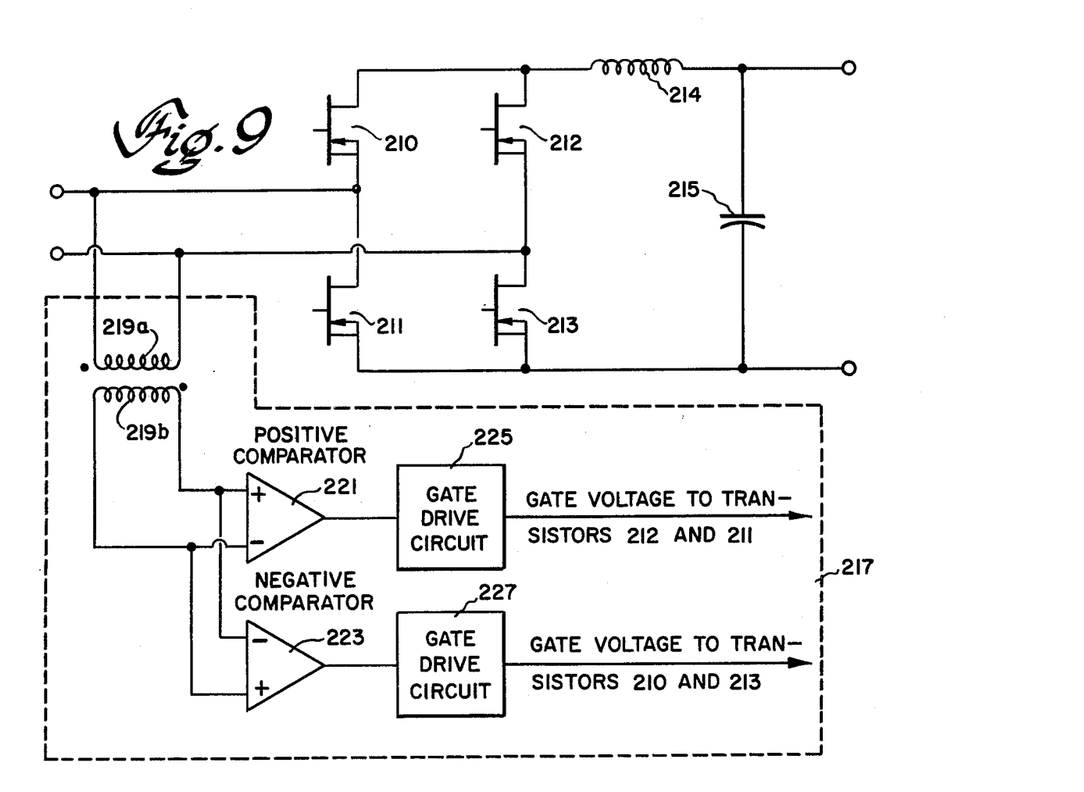
FIG. 9 is a part schematic, part block diagram representation of a single phase regeneration rectifier in accordance with the present invention.

The operation of the circuit of FIG. 3 is substantially the same as the circuit of FIG. 1. The power MOSFET regeneration circuit could instead be used with the control 3 of FIG. 1. The control 3 of FIG. 3 could be used in place of the control 3 of FIG. 1 with the bipolar transistors. A single phase embodiment of the circuit of FIG. 3 is shown in FIG. 9 and discussed hereinbelow.

Figure 4A:
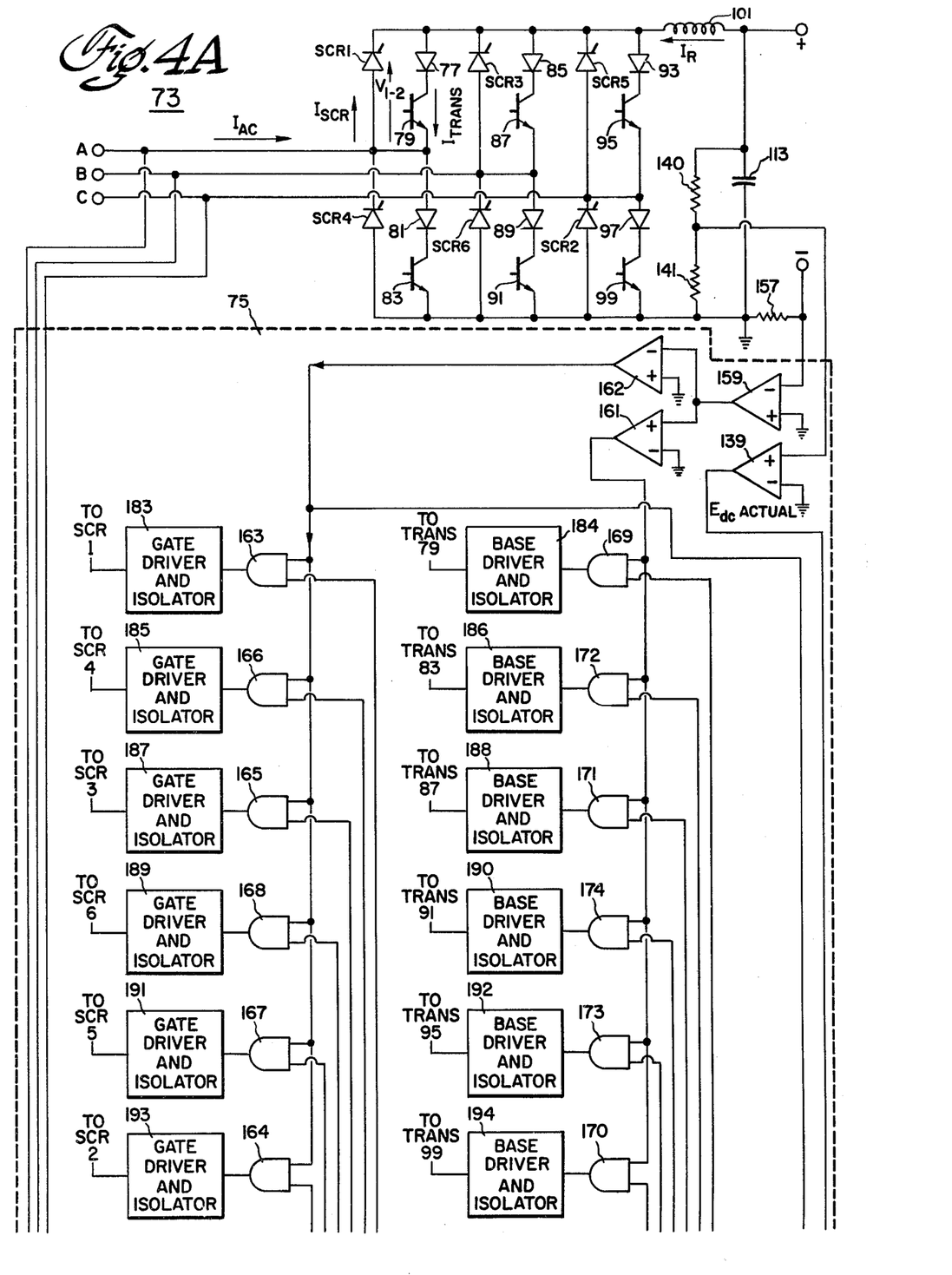
FIGS. 4A and B is a part schematic, part block diagram representation of a regenerative rectifier having a phase controlled rectifier in accordance with the present invention.
Figure 4B:
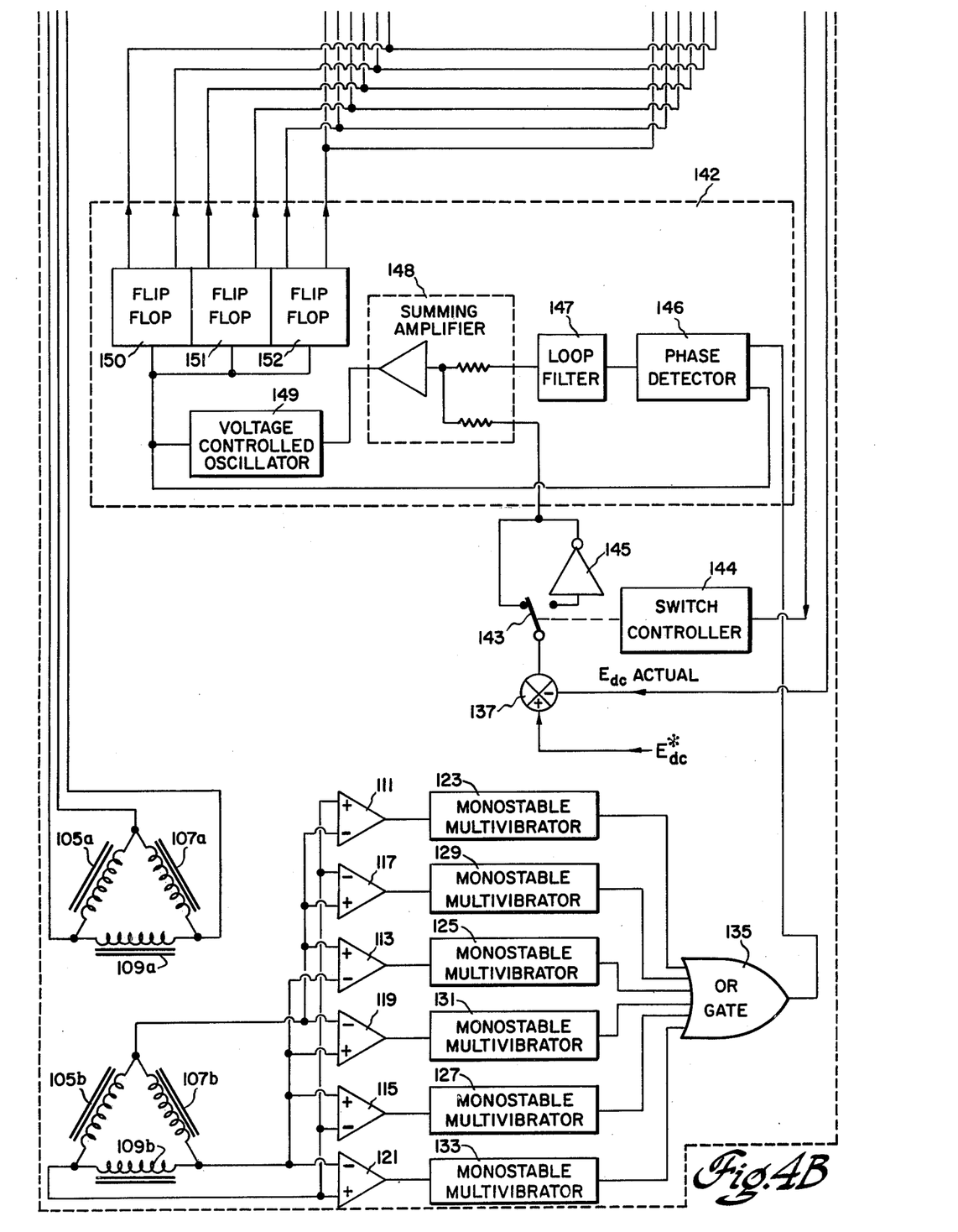

FIGS. 4A and 4B show another embodiment of the present invention comprising a phase controlled regenerative rectifier 73 comprises a three phase thyristor bridge having six thyristors SCR1-SCR6, with the A phase of the three-phase supply voltage connected at the junction between the series-connected thyristors SCR1 and SCR4. The B phase voltage is provided at the junction of the series connected thyristors SCR3 and SCR6 and the C phase voltage is provided at the junction of the series connected thyristors SCR5 and SCR2. The regenerative rectifier 73 further comprises, connected in parallel with each thyristor, respectively, the series combination, respectively, of a diode and transistor. The anode of a diode 77 is connected to the cathode of thyristor SCR1. The collector of a transistor 79 is connected to the cathode of diode 77. The emitter of transistor 79 is connected to the anode of thyristor SCR1 and to the phase A voltage. The anode of diode 81 is connected to the cathode of thyristor SCR4 and to the phase A voltage, and the cathode of diode 81 is connected to the collector of transistor 83. The emitter of transistor 83 is connected to the anode of thyristor SCR4. The series combination of diode and transistor, respectively, across thyristors SCR3, SCR6, SCR5 and SCR2, respectively, is 85 and 87, 89 and 91, 93 and 95, and 97 and 99, respectively.

The control 75 receives line voltages A, B and C at transformers 105, 107 and 109, respectively. The transformer primary winding 105a is connected between the line voltages A and B, the primary winding 107a is connected between the line voltages B and C and the primary winding 109a is connected between the line voltages C and A. Positive comparators 111, 113 and 115 determine the positive 180° portion of the line voltage of the delta-connected secondaries 105b, 107b and 109b respectively. Negative comparators 117, 119 and 121 determine the negative 180° portion of the line-to-line voltage of the delta-connected secondary 105b, 107b and 109b, respectively. The output of each of the comparators 111, 113, 115, 117, 119 and 121 is connected to a respective monostable multivibrator 123, 125, 127, 129, 131 and 133. each of which provides an output pulse when triggered by a leading edge of an input pulse. The output signals of the monostable multivibrators are combined in an OR gate 135.

An external dc voltage command $E_{dc}*$ is provided at one input of a summer 137, and a signal proportional to the actual dc voltage across capacitor 113 is provided at the other input of the summer by an operational amplifier 139, which receives input voltage from a voltage divider comprised of resistors 140 and 141 connected in series across capacitor 113. The voltage difference, or error signal, between the two signals provided to the summer 137 is supplied to a control switch 143. The switch position is determined by a switch controller 144. The error signal is provided directly to the phase shift control circuit 142 or it is first inverted by a signal inverter 145. The phase shift control circuit 142 comprises a phase detector 146 having two inputs. The first input is connected to the output of OR gate 135. The output of the phase detector is connected to a loop filter 147. The output of the loop filter together with the error signal from summer 137 are added together in summing amplifier 148 and provide an input voltage to the voltage controlled oscillator 149 whose output signal clocks three flip flops 150, 151 and 152. Each flip flop has two outputs at opposite states. The flip flops are connected to one another in a ring counter fashion to provide a change of state in the appropriate sequence, which is either to provide signals to thyristors SCR1–SCR6 or transistors 79, 99, 87, 83, 95, 91 in the order listed.

One end of a resistor 157 is connected to the junction of the emitter of transistor 99 and capacitor 113 and the other end is the negative dc output terminal of the regenerative rectifier. The resistor 157 is used as a current sensor. The voltage drop across the resistor provides an input to operational amplifier 159. The node between resistor 157 and capacitor 113, which is also the negative dc output of the regenerative rectifier, serves as a logic circuit ground.

The output of operational amplifier 159 is connected to a positive comparator 161 and a negative comparator 162. The inverting input and noninverting input of the positive and negative comparators, respectively, is connected to control circuit ground. Twelve two-input AND gates 163–174 each provide a signal for a gate drive circuit and isolator for thyristors SCR1-SCR6, respectively, and a signal for a base drive signal isolator for transistors 79, 83, 87, 91, 95 and 99, respectively, through gate drive and base drive circuits are 183–194, respectively. Each of the two input AND gates associated with a thyristor gate drive circuit receives an input signal from the output of negative comparator 162. Each of the AND gates associated with the base drive circuit receives an input from a positive comparator 161. The AND gates 163 and 169 each receive an input signal from the first output of flip flop 150. AND gates 166 and 172 each receive an input signal from the second output of flip flop 150. AND gates 165 and 171 each receive an input signal from the first output of flip flop 151. AND gates 168 and 174 each receive an input signal from the second output of flip flop 151. AND gates 167 and 173 each receive an input signal from the first output of flip flop 152. AND gates 164 and 170 each receive an input signal from the second output of flip flop 152.

The operation of FIG. 4 is as follows. The dc command $E_{dc}*$ is provided to control circuit 75. The dc output of rectifier 73 could be supplying a six step voltage source inverter (not shown), for example. The actual dc voltage across capacitor 113 is sensed by operational amplifier 139 which provides impedance isolation. The error voltage, which is the difference between the commanded and the actual voltage, is used to control the lead or lag associated with turn-on of the transistors or thyristors, and controls the average dc output voltage of the rectifier. There are many techniques for providing control delay (see for example, GE SCR Manual Sixth Edition, pp. 276–282). The technique provided in this embodiment is to provide a phase locked loop control with a voltage controlled oscillator shown in phase shift control circuit 142.

Figure 5:
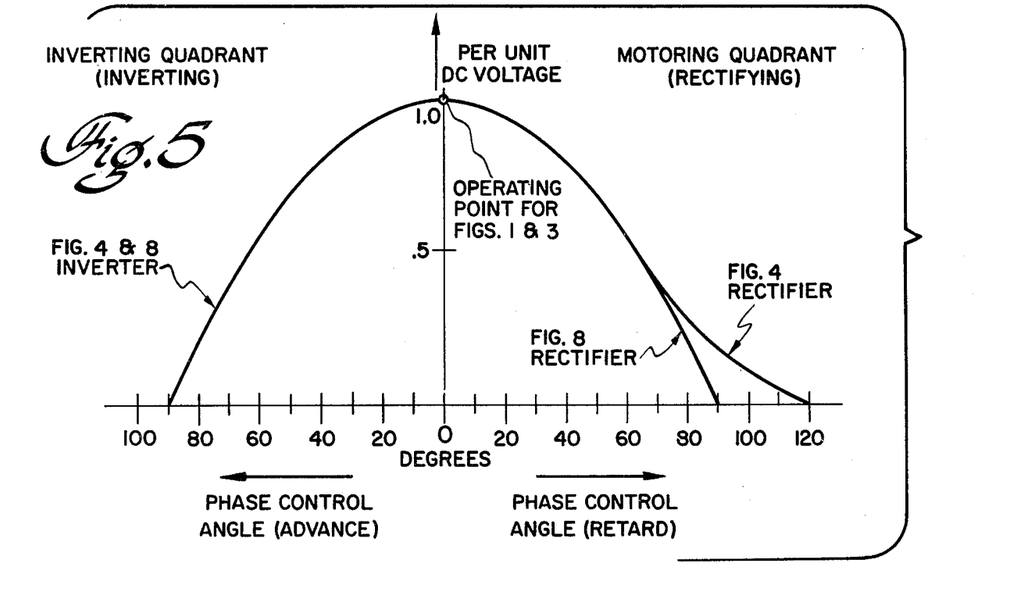
FIG. 5 is a chart showing the relationship between phase angle and per unit dc voltage for a phase controlled rectifier and self commutated inverter.
Figure 7:
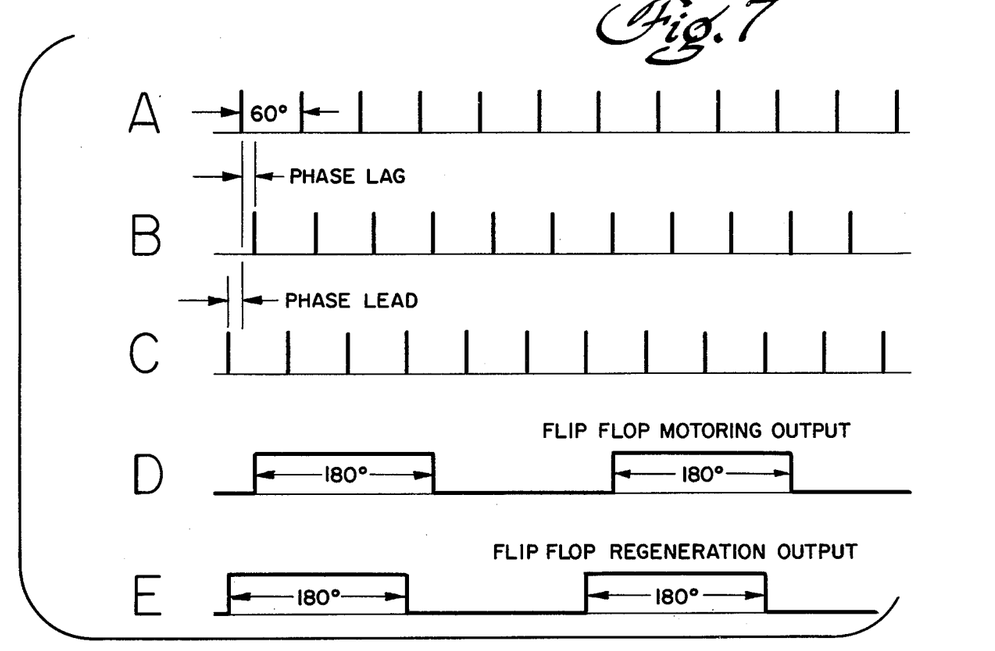

During motoring (power flow from ac to dc), the dc voltage on capacitor 113 is controlled by phasing back the gating of the thyristors with respect to the line-to-neutral ac voltage. A 90° phase back angle results in zero average volts on the capacitor. The relationship between the phase angle and voltage is shown in FIG. 5. The six power transistors are not supplied with base drive signals during motoring operation. Current sensor 157 during motoring provides a zero input to all the AND gates connected to the base drive circuit. The 180° pulses derived from the line-to-line zero crossings by the comparators 111, 113, 115, 117, 119 and 121, respectively, cause each of the monostable multivibrators 123, etc., respectively, to provide a narrow pulse in response to the leading edge of the 180° pulses. The output of the OR gate 135 is a train of pulses at a frequency of six times the input frequency with each pulse separated by 60° as shown in FIG. 7A. The output signal from the OR gate is used to synchronize phase-locked loop circuit 142. Lag and lead is introduced to the phase-lock loop by the error signal obtained from the difference between the actual and commanded voltage. The response of either lag or lead is determined by the sign of the error signal and whether the current is sensed to be flowing from the ac source to the capacitor (motoring), or not flowing, or flowing in the reverse direction (regeneration). As can be seen in FIG. 5, it is necessary to respond to an increasing positive error in regeneration by increasing phase lead, while it is necessary to respond to an increasing positive error during motoring by increasing phase lag. This is accomplished by sensing the direction of current supplied to the load such as an inverter through resistor 157 and when motoring is sensed, inverting the error signal resulting from the difference between actual dc voltage and commanded dc voltage. The error signal, which is produced by summer 137, is inverted (when motoring is sensed) in signal inverter 145. The phase error dc voltage from summing amplifier 148 controls the frequency of the voltage controlled oscillator 149. An increasing voltage signal amplitude supplied to the voltage controlled oscillator causes an increase in output frequency. The output pulse frequencies of the voltage controlled oscillator for motoring and regeneration are shown in FIGS. 7B and C, respectively. The output of one of the flip flops 150, 151 and 152 is shown for motoring and regeneration in FIGS. 7D and E, respectively. The thyristors SCR1–SCR6 are commutated by the reversal of the input voltage at the input frequency. The order in which the thyristors are gated is thyristor SCR1, SCR2, SCR3, SCR4, SCR5, SCR6.

Regeneration is begun after an appropriate interval of zero dc current to insure that all the thyristors are blocking before supplying base drive signals to the transistors. The base drive signals are phase advanced with respect to the line-to-neutral ac voltage in order to control the regenerative current and match the dc voltage magnitude to the ac voltage supply magnitude.

Figure 6:
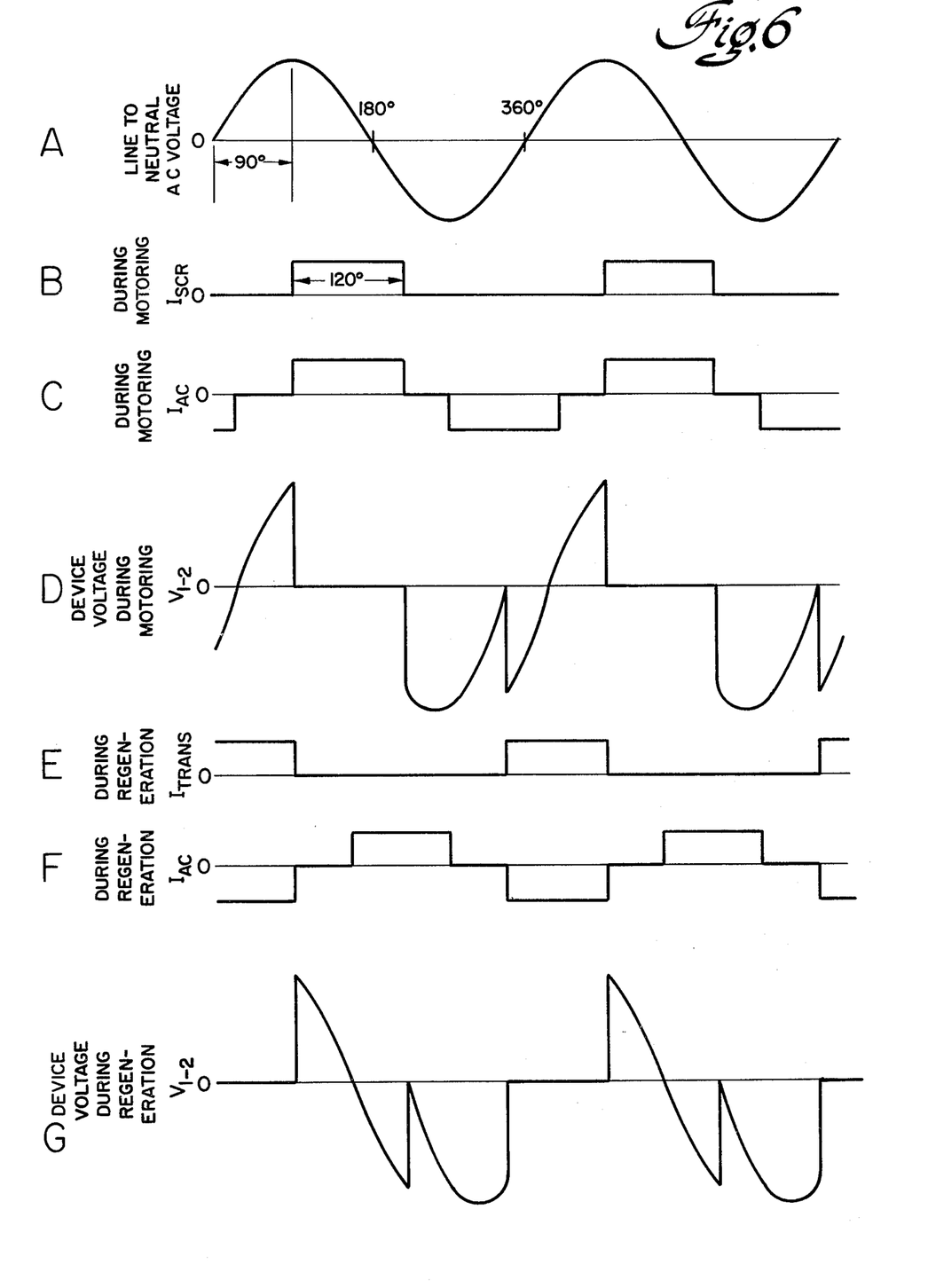

The six power transistors are not supplied with base drive signals during motoring operation. Waveforms of the line-to-neutral voltage, thyristor current for 60° phase-back, ac phase current during motoring, thyristor voltage during motoring, transistor current for 60° phase-advance, ac phase current during regeneration and transistor voltage during regeneration are shown in FIGS. 6A–G, respectively.

The regenerative rectifier of FIG. 4 can be configured for a single phase ac input using four thyristors and four transistors (plus four series diodes) with 180° conduction.

Figure 8A:
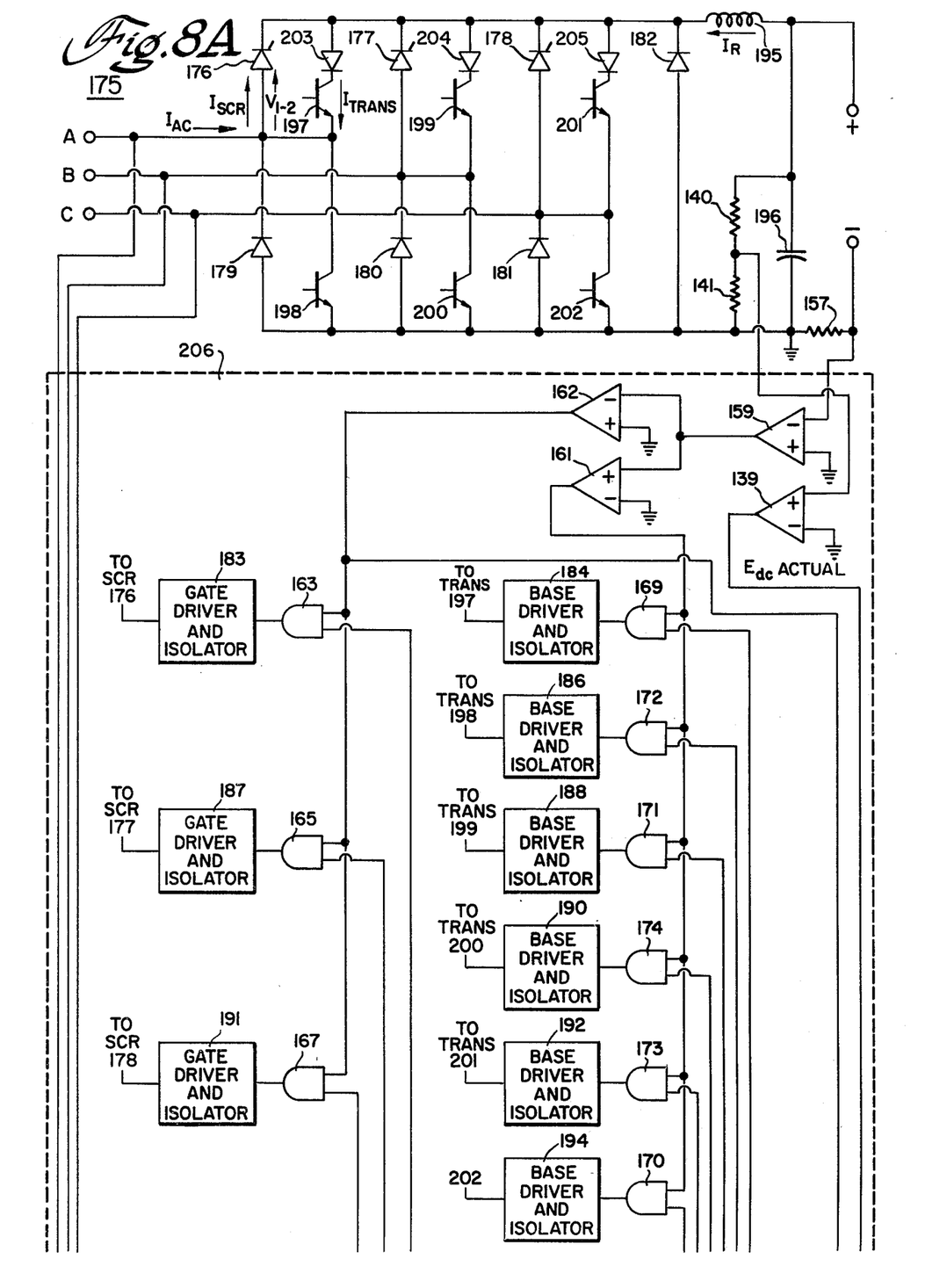
FIG. 8A and B is a part schemtic, part block diagram representation of a regenerative rectifier having a three thyristor, four diode rectifier in accordance with the present invention.

FIG. 8 shows a three phase regenerative rectifier 175 wherein the rectifiers comprised are of three thyristors 176, 177 and 178 and four diodes 179, 180, 181 and 182. In the first leg of the regenerative rectifier 175, thyristor 176 is in series with diode 179. The cathode of diode 179 is connected to the anode of thyristor 176. In the second leg of the regenerative rectifier the anode of thyristor 177 is connected to the cathode of diode 180 and in the third leg the anode of thyristor 178 is connected to the cathode of diode 181. One of the phases of a three phase supply (not shown) is connected to the junction between the thyristor and diode of each leg. A free-wheeling diode 182 is connected between the cathode of thyristor 178 and the anode of diode 181. An inductor 195 is connected between the cathode of diode 182 and one side of a capacitor 196. The other side of capacitor 196 is connected to the anode of diode 182. The output of the rectifier is available across the capacitor 196.

The regenerative circuitry of regenerative rectifier 175 comprises six transistors 197–202 and three diodes 203–205. The transistor 197 is connected in series with diode 203, with the cathode of diode 203 connected to the collector of transistor 197. The series combination is connected in inverse parallel with the thyristor 176. The diode 203 prevents reverse voltage from appearing across transistor 197. Similarly, the diode 204 is connected in series with transistor 199 and the series combination is connected in inverse parallel with thyristor 177. Diode 205 is connected in series with transistor 201 and the series combination is connected across thyristor 178. The transistors 198, 200 and 202 are connected in inverse parallel with diodes 179, 180 and 181, respectively. It is not necessary to connect a diode in series with the transistor (as in FIGS. 4A and 4B) when the transistor is in inverse parallel with a diode rather than a thyristor, since there can be no reverse voltage on the transistor due to the conduction of the parallel inverse connected diode. Uncontrolled devices (diodes) are not used in the inverting circuitry, as the devices used must have the capability of turn-off independent of the reversal of the ac voltage.

Figure 8B:
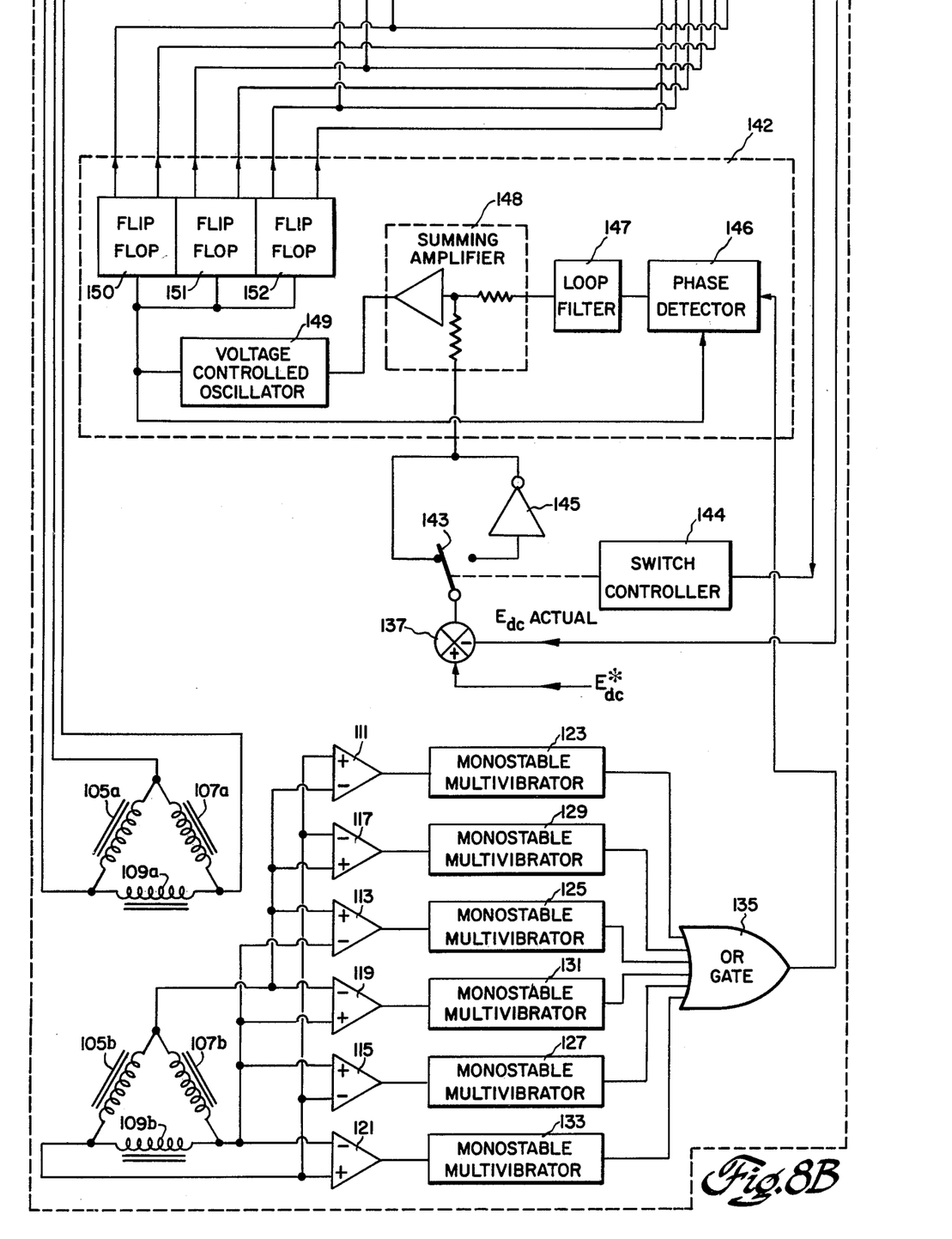

The control 206 is similar to control 75 of FIGS. 4A and 4B except that only nine 2-input AND gates are needed instead of twelve. The control circuit 206 receives an input from current sensing resistor 157, the voltage divider comprised of resistors 140 and 141 and three line-to-line voltage signals.

The operation of the circuit of FIGS. 8A and 8B is the same as that of the circuit of FIGS. 4A and 4B, except that phasing back on the gating of the three thyristors by 120° results in zero average dc volts, as indicated in FIG. 5. The free-wheeling diode 182 provides a path for inductor current when all three thyristors are nonconductive and also when operating under certain conditions with a lagging phase delay.

FIG. 9 shows a single phase regenerative rectifier in accordance with the present invention. Four N channel MOSFETs 210, 211, 212 and 213, respectively, are connected in a single phase full bridge arrangement. Single phase ac power is supplied by an external source (not shown) between MOSFETs 210, 211, 212 and 213. A dc filter comprising the series combination of an inductor 214 and capacitor 215 is connected in parallel with series-connected MOSFETs 210 and 211 and series-connected MOSFETs 212 and 213. The dc output voltage is available across capacitor 215. A control 217 comprising a transformer 219 having a primary winding 219a is connected across the ac supply and the secondary winding of the transformer 219b is connected to the two inputs of a comparator 221 and a comparator 223. The first end of secondary winding 219b is connected to the inverting and noninverting terminals in comparator 221 and 223, respectively, and the other end of secondary winding 219b is connected to the noninverting and inverting terminals of the comparators 221 and 223, respectively. The output of comparator 221 is coupled to gate drive circuit 225 which provides a gate signal to MOSFETs 212 and 211. The output signal of comparator 223 is coupled to the gate drive circuit 227 which provides gate signal to MOSFETs 210 and 213.

The operation of the circuit of FIG. 9 will now be described. The reverse integral pn junction diode, which is inherent in each of the MOSFETs acts as a rectifier for providing a dc output voltage across capacitor 215. The input voltage from an external source (not shown) is transformer-isolated by transformer 219 and provides an input voltage to comparator 221 which provides a 180° output pulse corresponding to a positive half cycle of the ac supply, and comparator 223 provides a positive half cycle of 180° output pulse corresponding to the negative half cycle of the supply. The MOSFETs are gated into conduction during motoring and regeneration, providing a path for either polarity of dc current through the regenerative rectifier.

The foregoing describes a regenerative rectifier suitable for use with adjustable frequency, adjustable voltage ac motor drive systems or adjustable voltage dc motor drive systems capable of power regeneration from a dc source to an ac supply by reversing the direction of current flow in the rectifier rather than reversing the dc output polarity.

While the invention has been particularly shown and described with references to several preferred embodiments thereof, it will be understood by those skilled in the art that various changes in form and details may be made therein without departing from the spirit and scope of the invention.

What is claimed is:

1. A phase controlled three phase regenerative rectifier responsive to an external dc voltage command, for receiving input power from a three phase ac source and supplying direct current to an external load, comprising:

a phase-controlled three phase rectifier having a plurality of gate-controlled rectifying elements arranged in a bridge configuration;

a plurality of controllable switch means with self-commutating ability coupled, respectively, in inverse parallel with each rectifying element, respectively, said plurality of controllable switch means forming an inverter;

means for sensing the output voltage of said rectifier;

means for sensing the direction of current flow to the external load; and control means responsive to the means for sensing rectifier output voltage and to the means for sensing current flow to the external load, and coupled to said plurality of gate-controlled rectifying elements and to said plurality of controllable switch means, for adjusting the phase lag of said rectifying elements and the phase lead of said controllable switch means responsive to the direction of current flow to said external load and the difference between the dc voltage command and actual dc voltage across said external load, so that when the current supplied to the load is positive the phase lag of said rectifying elements is adjusted to provide the commanded dc voltage and when said current in said load is zero or negative the phase lead of the controlled switch means provides regenerative current to the ac source.

2. A three phase regenerative phase controlled rectifier responsive to a dc voltage command, for receiving a power input from a three phase ac source and supplying direct current to a load, comprising:

three thyristors and three rectifying diodes connected, in a bridge configuration with each of said three thyristors, respectively, in the upper half of each leg, respectively, of said bridge and each of said three diodes, respectively, in the lower half of each leg, respectively;

three transistors and three blocking diodes connected to form three pairs of one transistor and one diode in series, each one of said pairs, respectively, coupled in inverse parallel with each one of said thyristors, respectively;

three additional transistors, each one of said additional transistors connected, respectively, in inverse parallel with each of said rectifying diodes in the lower half of said bridge, respectively;

a freewheeling diode connected across the dc output of the bridge;

means for determining the direction of current flow to said load; and control means coupled to each of said transistors and thyristors and to said means for determining direction of current flow, for adjusting the phase lag of said thyristors and the phase lead of said transistors responsive to the direction of current flow to the load and the commanded dc value.

3. The three phase regenerative phase controlled rectifier of claim 2 wherein said control means comprises:

a phase detector;

a low pass filter coupled to the output of the phase detector;

a summing amplifier receiving at one input the output voltage of said low pass filter and at another input the voltage difference between said actual and commanded dc voltages; and a voltage controlled oscillator responsive to the output voltage of the summing amplifier and providing lagging and leading frequencies relative to the zero crossings of each phase of the line-to-line ac supply for controlling said thyristors and transistors;

said phase detector comparing the phase-shifted output frequency of the voltage controlled oscillator and a synchronizing frequency signal representative of zero crossings of each phase of the line-to-line ac supply.

* * * * *